March 26, 1963 R. C. SLAUTTERBACK 3,083,256
BATTERY VENT PLUG
Original Filed June 27, 1961 3 Sheets-Sheet 1

ROBERT C. SLAUTTERBACK
*INVENTOR.*

BY
ATTORNEYS

March 26, 1963  R. C. SLAUTTERBACK  3,083,256
BATTERY VENT PLUG

Original Filed June 27, 1961  3 Sheets-Sheet 2

ROBERT C. SLAUTTERBACK
*INVENTOR.*

BY *John R. Faulkner*
*Keith L. Berschling*
ATTORNEYS

March 26, 1963 R. C. SLAUTTERBACK 3,083,256
BATTERY VENT PLUG

Original Filed June 27, 1961 3 Sheets-Sheet 3

ROBERT C. SLAUTTERBACK
INVENTOR.

BY *John R. Faulkner*
*Keith L. Zerschling*

ATTORNEYS

United States Patent Office 3,083,256
Patented Mar. 26, 1963

3,083,256
BATTERY VENT PLUG
Robert C. Slautterback, Toledo, Ohio, assignor to Ford Motor Company, Dearborn, Mich., a corporation of Delaware
Original application June 27, 1961, Ser. No. 119,935. Divided and this application Jan. 2, 1962, Ser. No. 163,761
3 Claims. (Cl. 136—177)

This invention relates to vent plugs for lead acid storage batteries and more particularly to vent plugs for storage batteries of the type used in automotive vehicles such as passenger automobiles and commercial vehicles.

This application is a division of application Serial Number 119,935, filed June 27, 1961.

It is well known to those experienced in the battery industry that a definite problem exists of satisfactorily venting wet storage battery cells to allow escape of generated gases, which are developed within the cell during normal charging periods, without allowing escape of the electrolyte liquid. In the past, it has been determined that a certain amount of electrolyte liquid escapes from the cell in the form of a mist or vapor, which is developed during certain charging periods when the electrolyte tends to boil. This mist or vapor escapes through the vent plugs along with the escaping gases. A certain amount of electrolyte liquid also escapes through the vent plugs as a result of splashing when the vehicle in which the battery is installed is subject to considerably rough use. It has also been determined that a certain amount of electrolyte will spill through vent holes in the vent plugs as a result of present day methods of transporting or storing vehicles in an angular position.

It is, therefore, a principal object of this invention to provide an improved lead acid storage battery vent plug of either the push-in type or the screw-in type which will have the necessary characteristics to prevent the loss of electrolyte liquid either by means of escaping vapors, splashing due to action of the vehicle in which the battery is installed, or spilling due to angular positions of the vehicle.

Another object of this invention is to provide a vent plug of the type described which will reduce to a minimum the amount of loss of electrolyte liquid, and still be more simple and economical to manufacture.

Another object of the invention is to provide a vent plug of the type described which is constructed of two pieces of plastic material in such a way that heating or cementing operations are not necessary to produce a completely assembled vent plug.

Still another object of the invention is to provide a push-in type battery vent plug constructed of two pieces of plastic material, one member being molded of a semi-rigid plastic and the other member being molded of a rigid plastic, so that, in the completed assembly, the rigid member tends to prevent deformation of the semi-rigid member when the vent plug is inserted in or removed from a battery cell opening.

Other objects and attendant advantages of the invention will become more readily apparent as the specification is considered in connection with the attached drawings in which.

Figure 1:
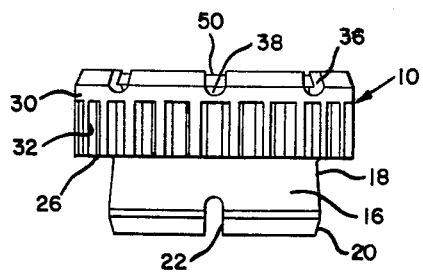
FIG. 1 is a side elevational view of an assembled vent plug incorporating the features of this invention.
Figure 3:
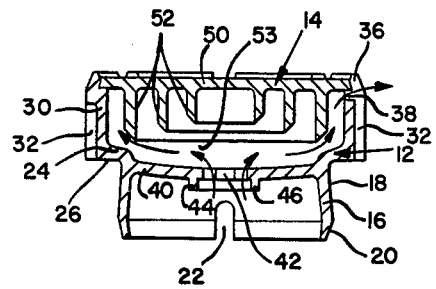
FIG. 3 is a sectional elevation taken on line 3—3 of FIG. 2.
Figure 2:
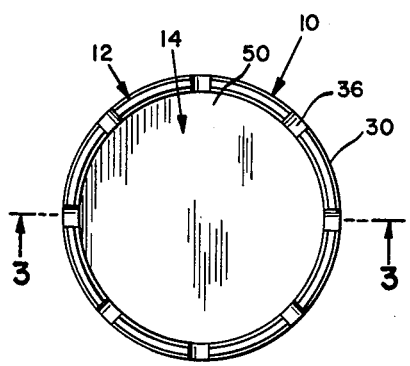
FIG. 2 is a top plan view of the same vent plug.

Referring to the drawings, particularly FIGS. 1, 2 and 3, a two-piece molded plastic vent plug 10 is shown. The plug is a push-in type and comprises a main body portion or member 12 and a cap member 14. Both of the members are molded of suitable acid-resistant plastic materials which will provide sufficient flexibility for the push-in portion of the vent plug and also provide a certain amount of rigidity to prevent deformation of the vent plug when inserted in or removed from a battery cell cover. It has been determined that a plastic material such as polypropylene or the like has the flexible characteristics desirable for the push-in or main body member 12, and that a more rigid material such as polystyrene be used for the cap member 14 to reinforce the body member 12 when the two members are assembled.

The main body 12 of the vent plug 10 is provided with a downwardly extending annular wall portion 16, the upper portion 18 of which has a conical configuration which terminates at its lower edge into a shorter inverted conical portion 20. The portion 20 of the annular wall 16 facilitates inserting the vent plug into a battery cell cover, and the entire annular wall, including the portions 18 and 20, will provide a liquid seal between the outer surface of the vent plug and the cell cover opening (not shown). In some applications of the vent plug it may be desirable to provide additional flexibility of the wall portion 16 to facilitate inserting the plug into various other types of cell covers. This can be accomplished by providing one or more vertical slots 22 in the lower edge of the wall 16 which will allow a slight collapse of the wall and reduce its outer circumference.

The conical portion 18 of the wall 16 terminates at its upper end into an annular horizontal flange portion 24. A lower surface 26 of the flange 24 provides an abutment which cooperates with a portion of a battery cell cover (not shown) to determine the fully inserted position of the vent plug. Integral with the flange portion 24 is another annular wall 30 which extends upwardly and is provided with a plurality of vertical grooves or indentations 32 around its outer surface. The grooves or indentations 32 provide a finger-grip surface for easier manual installation or removal of the vent plug.

Figure 4:
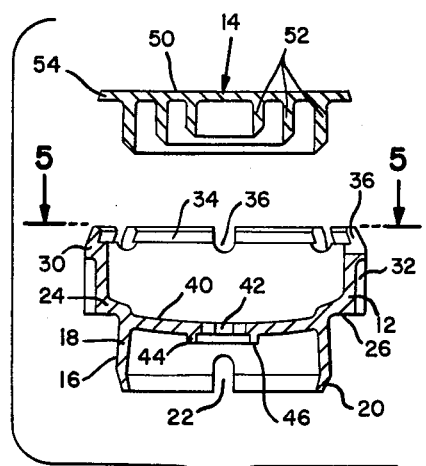
FIG. 4 is a composite view showing a sectional elevation of the two parts of the vent plug.
Figure 5:
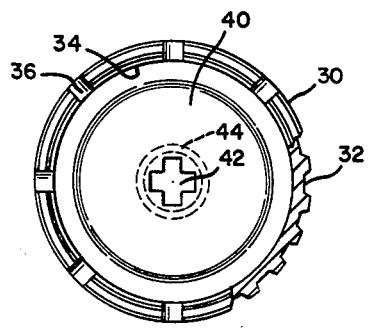
FIG. 5 is a top view, partly in section, of the main body of the vent plug.

Around the inner surface of the wall 30, and near its upper edge, is a retaining groove 34, FIGS. 4 and 5. The groove 34 provides a means of retaining the cap member 14 in assembled position in the body member 12, which will be better understood hereinafter. A number of vertical slots 36 are provided in the upper edge of the wall 30 which provide a number of annular vent holes 38 around the upper portion of the vent plug when the cap member 14 is assembled in the body member 12.

Included in the body member 12 is an integral horizontal baffle 40 which has a dish-shaped configuration and is located midway between the top and bottom of the body member 12, and is integral with the inner surface of the annular wall 16. The baffle 40 is provided with a central aperture 42, and an integral ring portion 44 extending downwardly from the bottom surface of the baffle 40 and surrounding the aperture 42. The aperture 42 is shown in the drawings as having a cross-shaped configuration which tends to prevent accumulated electrolyte from forming a film trap across the aperture. It is well known that a film of liquid will develop easily in a circular opening, whereas an opening formed of straight sides and/or distinct corners tends to prevent the formation of such films.

The ring 44 is provided to prevent electrolyte that accumulates on the bottom surface of the baffle 40, and due to dish-shaped configuration runs toward the aperture 42, from collecting around the edges of the aperture. Instead, the accumulated electrolyte will form droplets around a lower edge 46 of the ring and, due to vibration and gravity, fall from the vent plug back into the battery cell.

The cap member 14 (FIG. 4) comprises a horizontal disk-shaped portion 50, and a plurality of integral baffle tubes 52 extending downwardly from the bottom surface of the disk portion 50. The peripheral edge of the disk-shaped portion 50 is provided with a taper, as shown at 54, which cooperates with the groove 34 in the main body 12 to retain the cap member 14 in an assembled position in the main body member. The process of assembling the two members consists of merely snapping the cap member 14 into position in the groove 34 of the body member. This type of construction eliminates the need for adhesives or heat-sealing operations commonly used in the past. When the cap member 14 is in position in the body 12 a relatively small area on the bottom surface of the disk-shaped portion 50 cooperates with a lower portion of the vertical slots 36 (FIG. 3) to form the annular vents 38.

The downwardly projecting baffle tubes 52 on the cap member 14 are provided for the purpose of causing a reversal or turbulence of escaping gases in a chamber 53 before they reach the vent holes 38. By providing a tortuous path within the vent plug chamber 53, the velocity of the gases will be reduced, allowing electrolyte vapors carried by the gases to gradually collect on the various inner surfaces of the vent plug rather than escape through the vents, resulting in a loss of electrolyte in the battery cell. As the vapors collect on the surfaces of the baffle portions 52 and the inner surface of the body member 12, they will gradually form droplets on the various edges and eventually return to the battery cell through the aperture 42.

The general relationship between the tubular baffles 52 and the structural configuration of the body member 12 prevents any splashing electrolyte from reaching the vents 38, and also reduces the volume of liquid allowed to spill from the battery cells if the battery is tilted.

The vent plug, as described hereinabove, is a preferred form of the invention, but the more desirable features of the invention may be incorporated in various other forms of vent plugs, as shown in FIGS. 6 through 16 inclusive.

Figure 6:
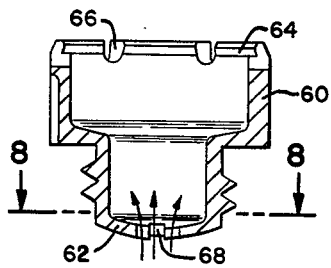
FIG. 6 is a sectional elevation of a modification of the main body of the vent plug.

In FIG. 6 a body member 60 is shown having a dish-shaped baffle 62, a cap-retaining groove 64, and a number of vertical slots 66 which will provide annular vent holes similar to the holes 38 in FIG. 3. The baffle 62 is provided with a cross-shaped aperture 68 identical to the aperture 42 in FIG. 5. The main differences between the body members 12 and 60 is that one is a screw-in type and that the baffle 62 is located at the bottom of the body member 60.

Figures 7, 8:
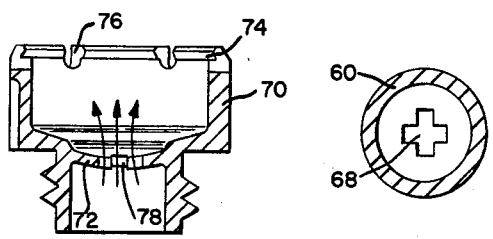
FIG. 7 is a sectional elevation of still another modification of the main body.
FIG. 8 is a sectional view taken on line 8—8 of FIG. 6.

In FIG. 7, a similar body member 70 is shown having a dish-shaped baffle 72, a cap-retaining groove 74, and a number of vertical slots 76. The baffle 72 is also provided with a cross-shaped aperture 78. In this form, the baffle 72 is located midway between the top and bottom of the body member 70. Both of the forms shown in FIGS. 6 and 7 can be provided with a cap member having the same configuration as the cap member 14, described hereinabove, and the same snap-in assembling feature.

Figure 9:
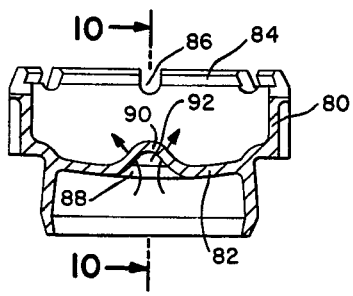
FIG. 9 is a sectional elevation of another modification.
Figure 11:
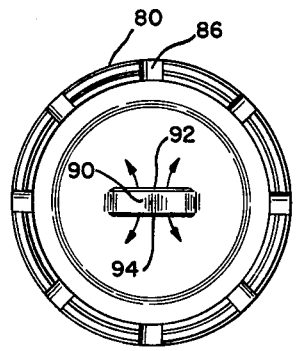
FIG. 11 is a top plan view of the modification shown in FIG. 9.
Figure 10:
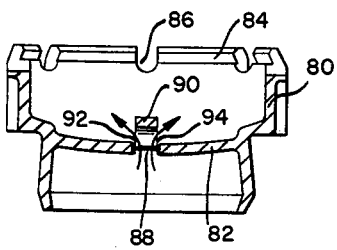
FIG. 10 is a sectional elevation taken on line 10—10 of FIG. 9.

Another modification is shown in FIGS. 9, 10 and 11. In these drawings, a push-in type body 80 is shown having a dish-shaped baffle 82, a cap-retaining groove 84, and a number of vertical slots 86. The only difference between this vent plug body and the one in FIG. 4 is the aperture in the baffle 82. The aperture is formed by providing a rectangular opening 88 in the center of the baffle 82 with an integral curved hood 90 directly over the opening 88. The hood 90 appears to be a displaced portion of the baffle 82 as a result of forming the opening 88, but it is actually molded in position as an integral part of the baffle 82. The hood 90 is formed so that two openings 92 and 94 are provided, one on either side of the hood, between the lower longitudinal edges of the hood and the longitudinal edges of the rectangular opening 88. When the gases escape from the battery cell (not shown) through the opening 88, the hood will act as a baffle and cause the gases to change direction. The gases will then travel at a reduced velocity through the openings 92 and 94, as shown by the arrows in the drawings. The body 80 can also be provided with a cap member similar to the cap 14 in FIG. 4.

Figure 12:
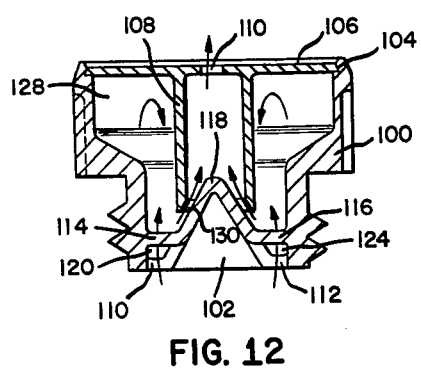
FIG. 12 is a sectional elevation taken through another modification of an assembled vent plug.
Figure 13:
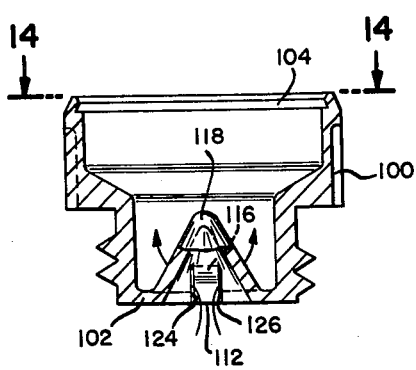
FIG. 13 is a sectional elevation of the same body shown in FIG. 12 taken on a line transverse to the view shown in FIG. 12.
Figure 14:
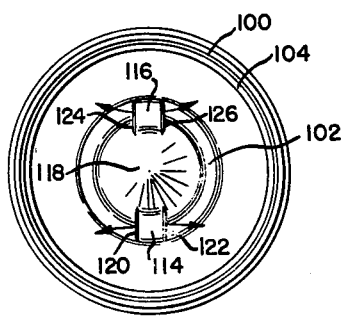
FIG. 14 is a top plan view taken on line 14—14 of FIG. 13.

In FIGS. 12, 13 and 14 another modification is shown wherein a screw-in type body 100 is provided with a conical baffle portion 102, and a similar cap-retaining groove 104. A cap member 106 is shown in the drawing which is provided with a downwardly-projecting baffle tube 108 and a vent opening 110. The cap member 106 is assembled in the body 100 in the same snap-in fashion as the cap 14 and retained in positioned without adhesives or a heating operation. The conical baffle 102 is an integral portion of the body member 100 and projects upwardly from the bottom edge of the body member 100. At the base of the conical baffle 102 are two oppositely-disposed openings 110 and 112, which are formed in much the same way as the aperture 88 in FIG. 9, that is, the openings 110 and 112 are substantially rectangular and provided with hood baffle portions 114 and 116 respectively. The hood baffles 114 and 116, resembling bridges between the body member 100 and a cone portion 118 of the baffle 102, create side openings 120, 122, and 124, 126 respectively. As in FIG. 9, this arrangement causes escaping gases to change direction, thereby reducing the velocity of the gases before reaching an upper chamber 128 of the vent plug. Also, electrolyte film traps will not form in the vents due to the configurations of the various openings.

In the assembled plug, as shown in FIG. 12, the cone portion 118 projects a short distance into the lower end of the baffle tube 108 leaving an annular opening 130 between the lower edge of the tube and the annular surface of the cone portion 118. The annular opening 130 is located relatively low in the chamber 128, so that escaping gases will be required to change direction in the chamber 128, which again reduces the velocity of the gases before they reach the vent 110 in the cap 106. The tortuous path of the gas flow is shown by the arrows in the drawings.

Figure 15:
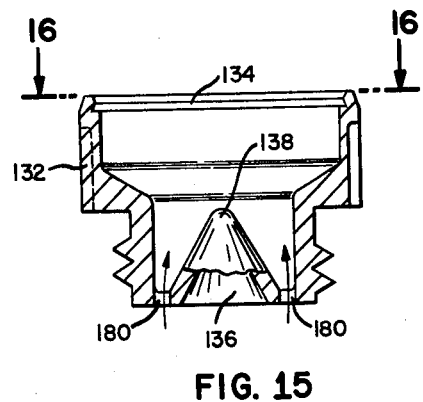
FIG. 15 is a sectional elevation of still another modification.
Figure 16:
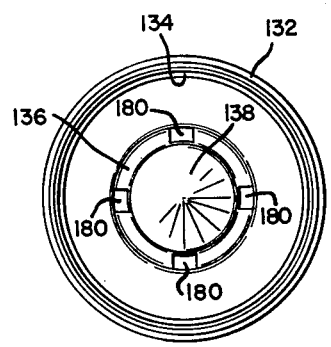
FIG. 16 is a top plan view taken on line 16—16 of FIG. 15.

Another modification, FIGS. 15 and 16, shows a vent plug body member 132 which is provided with a cap-retaining groove 134, and a conical baffle portion 136 having an upwardly projecting cone portion 138. This modification is similar to the one shown in FIG. 12, except for the vent openings in the baffle portion of the main body. In this modification it has been determined that the velocity of the escaping gases is reduced by providing a plurality of radially disposed arcuate openings 180 around the base of the cone 138. The gases can then be vented through a cap member similar to the cap member 106, or any modification thereof, which would be snapped into position in the groove 134.

It will be understood that the invention is not to be limited to the exact construction shown and described and that various changes and modifications may be made without departing from the spirit and scope of the invention as defined in the appended claims.

I claim:

1. A battery vent plug comprising an annular body member, a conical baffle supported by said annular body member and including an upwardly projecting cone, a plurality of hooded vent openings formed around the base of said upwardly projecting cone, closure means covering the upper end of said annular body member, said closure means including a downwardly projecting tubular baffle, the apex of said upwardly projecting cone projecting into said tubular baffle to an extent to form an annular opening between said tubular baffle and said upwardly projecting cone, said closure means having a vent opening positioned therein and located within a surface inscribed on said closure means by said tubular baffle.

2. A two-piece molded plastic battery vent plug structure including a flexible main body member and a rigid cap member, the main body member having a downwardly projecting annular wall portion, an upwardly projecting annular wall portion, an intermediate horizontal flange portion integral with the upper and lower annular wall portions, an annular retaining groove in the inner surface and near the upper edge of the upper wall portion, a conical baffle portion integral with and across the bottom of the main body member, and hooded apertures in the conical baffle portion, said cap member having a disk-shaped portion, a tapered peripheral edge on said disk-shaped portion, a baffle tube projecting downwardly from the disk-shaped portion, said tapered peripheral edge of the cap member cooperating with the annular groove in the main body member to provide a snap-in assembly arrangement of the two members; said disk-shaped portion of said cap member having an aperture positioned therein in a position to vent the baffle tube.

3. A two-piece molded plastic battery vent plug structure including a flexible main body member and a rigid cap member, the main body member having a downwardly projecting annular wall portion, an upwardly projecting annular wall portion, an intermediate horizontal flange portion integral with the upper and lower annular wall portions, an annular retaining groove in the inner surface and near the upper edge of the upper wall portion, a conical baffle portion integral with and across the bottom of the main body member, and hooded apertures in the conical baffle portion, said cap member having a disk-shaped portion, a tapered peripheral edge on said disk-shaped portion, a concentric baffle tube projecting downwardly from the disk-shaped portion, said conical baffle portion extending into said concentric baffle tube to form an annular passage between the said conical baffle portion and said concentric baffle tube, said tapered peripheral edge of the cap member cooperating with the annular groove in the main body member to provide a snap-in assembly arrangement of the two members, and a vent opening in the disk-shaped portion of the cap member positioned over said baffle tube.

References Cited in the file of this patent

UNITED STATES PATENTS

| | | |
|---|---|---|
| 1,459,121 | Van De Wiel | June 19, 1923 |
| 2,571,893 | Kendall | Oct. 16, 1951 |
| 2,690,466 | Kendall et al. | Sept. 28, 1954 |